Patented Jan. 5, 1932

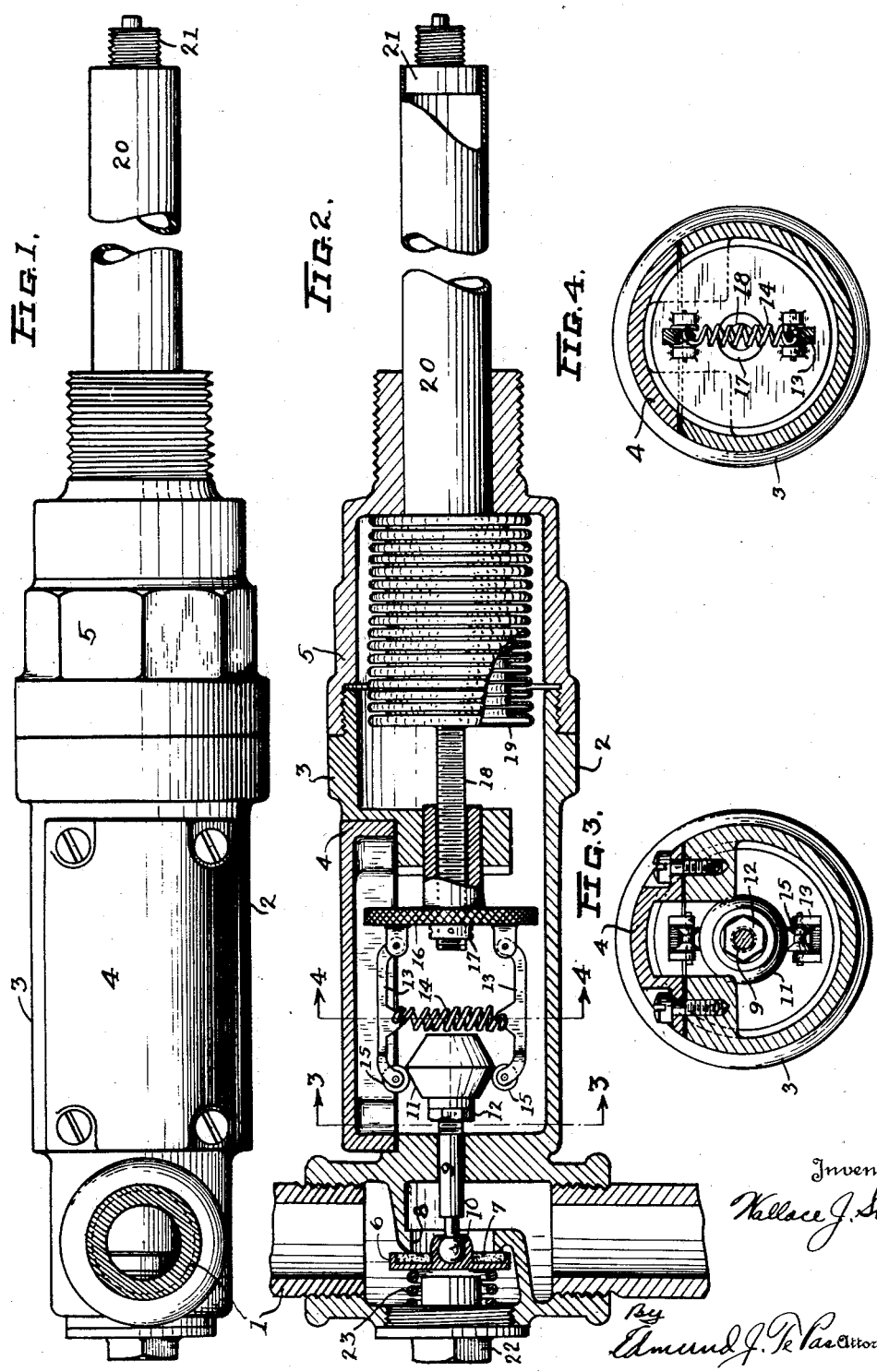
Jan. 5, 1932. W. J. SNOW 1,840,060
THERMOSTATIC VALVE
Original Filed July 19, 1926

1,840,060

UNITED STATES PATENT OFFICE

WALLACE J. SNOW, OF LAKEWOOD, OHIO, ASSIGNOR TO THE CLEVELAND HEATER COMPANY, OF CLEVELAND, OHIO, A CORPORATION OF OHIO

THERMOSTATIC VALVE

Original application filed July 19, 1926, Serial No. 123,561. Divided and this application filed December 5, 1927. Serial No. 237,643.

This invention is a division of my prior application No. 123,561 filed July 19, 1926 for improvements in fluid fuel control system and it relates to improvements in thermostatic valves.

One of the objects of this invention is to provide a generally simplified construction of thermostatic valve in which the elements of the valve are so arranged as to lend themselves readily to modern mass production methods. A further object of this invention is to provide a thermostatic valve that is responsive to small temperature changes and that operates with a snap movement with the further provision of adjustment means for varying the temperature setting of the valve.

Certain embodiments of the invention are illustrated in the accompanying set of drawings wherein—

Fig. 1 is a plan view of the thermostatic valve;

Fig. 2 is a sectional view taken on the axis of the thermostatic valve;

Fig. 3 is a section taken on line 3—3 of Fig. 2;

Fig. 4 is a section taken on line 4—4 of Fig. 2.

The thermostatic valve 1 shown in detail in Figs. 1 to 4 inclusive, is responsive to the temperature of the fluid in the containers of a water heater or boiler (not shown) and is adapted to be supported in the tank of such an appliance by means of a threaded coupling 5. This coupling also serves as a support for the combined valve casing and valve mechanism housing 3. A cover 4 forms a gas-tight closure for the housing. A valve seat 8 is formed within the valve casing. The valve head 6 is provided with a face 7 of a yielding material such as leather and co-operates with the valve seat 8 to control the flow of gas through the valve.

The valve head 6, is movably mounted upon a valve stem 9 by means of a ball and socket joint 10. The valve stem 9 is journaled in the valve casing and upon the end opposite to that supporting the valve head a cam 11 is adjustably mounted. This cam is of the shape of the lower half of two similar cones placed base to base. The cam is drilled and threaded for the reception of the valve rod 9 which is secured in its proper adjustment with the cam by the nut 12. A spring 23 is provided to close the valve in case of breakage of the spring 14 or of the links 13.

The coupling 5 is externally threaded and adapted to be screwed into a tank or fluid container and at the same time support the thermostat which comprises a tube 20 provided with a closure plug 21 at one end and an expansible contractible element 19 at the other end. These two elements 19 and 20 form a sealed container for a liquid such as acetone which is put in this container under reduced pressure and when subjected to heat the vapor pressure of this liquid allows the bellows or expansible contractible element 19 to expand.

This movement is transferred to a threaded rod 18 fastened at one end to the bellows and carrying on its opposite end a cross head or knurled disc 16. This cross head is adjustably mounted on the rod 18 and is held in the proper position by means of a lock-nut 17. The cross head carries a pair of bearings for two links 13 which are pivotally mounted at one end in the bearings of the cross head and upon their opposite ends carry a roller 15. The ends of the spring 14 are secured to the links 13 at a point between their ends and serve to urge the rollers 15 in contact with the cam 11.

Upon a movement of the bellows 19 and its cross head 16 which is attached to it, the rollers 15 rise upon the cam surface 11 in one direction or the other depending upon the action of the bellows 19 and upon passing the highest point of the cam the spring 14 pressing the rollers against the inclined surface of the cam 11 causes the valve to either open or close, as the case may be with snap action. As the pressure inside the bellows 19 and tube 20 at room temperature is less than atmospheric a leak or break in these parts would permit the bellows to assume its normal non-contracted position, thereby closing the valve.

In this manner a group of gas burners may be put into and out of operation by the temperature of a liquid they are heating, thermostatic valve 1 opening and closing when the contents of the storage tank reaches predetermined low and upper limits, respectively, of temperature and serving to cause gas to be supplied to and cut off from the burners in the manner described.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

I claim:

1. A thermostatic valve comprising, a sealed tube and a bellows adapted to expand and contract with temperature changes therein, a threaded rod carried by the free end of said bellows, a crosshead adjustably carried by said rod, a pair of spring resisted levers pivotally secured to said cross head, a cam engaged by the free ends of said levers and adapted to be shifted thereby, a valve head and valve stem rigidly secured to said cam, and a valve body having a valve port therein cooperating with said valve head and said associated mechanism to control fluid flow therethrough.

2. A thermostatic valve of the immersion type for liquid heaters and the like comprising, a coupling member adapted to support a thermostat in contact with the contents of a liquid container, and an integral casting detachably received in said member providing a valve body with inlet and outlet openings and a control port in axial alignment with said coupling member and thermostat, and a valve mechanism housing open on one side and separated from the valve body portion of said castings by a partition wall, a valve member in said body associated with said port, and snap action mechanism in said housing associated with said valve member and thermostat.

3. A thermostatic valve of the immersion type for liquid heaters and the like comprising, a coupling member adapted to support a thermostat in contact with the contents of a liquid container, an integral casting detachably received in said member providing a valve body with inlet and outlet openings, and a control port in axial alignment with said coupling member and thermostat, and a valve mechanism housing open on one side and separated from the valve body portion of said casting by a partition wall, a removable cover adapted to provide a gas-tight closure for the opening of the mechanism housing of said casting, a valve member in said body associated with said port, and snap action mechanism in said housing operatively associated with said valve member and thermostat.

4. A thermostatic valve comprising, a temperature responsive expansible-contractible container, snap action mechanism adjustably secured thereto, and valve means operatively associated therewith, said snap action mechanism being interposed between said container and said valve means so as to be accessible for adjustment purposes, said container, valve means and snap action mechanism being disposed in substantial alignment upon a common axis.

5. A temperature responsive valve comprising, a thermostat, spring resisted pivoted levers carried by said thermostat and adapted to be readily adjusted with respect thereto, a cam engaged by said levers, and valve means associated with said cam.

In testimony whereof I affix my signature.

WALLACE J. SNOW.